(12) United States Patent
Dunlap et al.

(10) Patent No.: US 7,826,363 B2
(45) Date of Patent: Nov. 2, 2010

(54) BANDWIDTH ESTIMATION ALGORITHM USING INTERNET CONTROL MESSAGE PROTOCOL (ICMP) ECHO REQUEST

(75) Inventors: Sean S. Dunlap, Norcross, GA (US); David M. Pullen, Hayesville, NC (US)

(73) Assignee: Broadcom Corporation, Irvine, CA (US)

( * ) Notice: Subject to any disclaimer, the term of this patent is extended or adjusted under 35 U.S.C. 154(b) by 1234 days.

(21) Appl. No.: 11/189,983

(22) Filed: Jul. 27, 2005

(65) Prior Publication Data
US 2007/0025263 A1    Feb. 1, 2007

(51) Int. Cl.
*G01R 31/08* (2006.01)
(52) U.S. Cl. ...................................................... 370/232
(58) Field of Classification Search ................. 370/468, 370/236, 248, 238, 232, 233, 234, 252, 254
See application file for complete search history.

(56) References Cited

U.S. PATENT DOCUMENTS

| | | | | |
|---|---|---|---|---|
| 5,231,631 A | * | 7/1993 | Buhrke et al. ............... | 370/230 |
| 5,835,720 A | * | 11/1998 | Nelson et al. ............... | 709/224 |
| 6,498,783 B1 | * | 12/2002 | Lin ............................. | 370/252 |
| 6,614,763 B1 | * | 9/2003 | Kikuchi et al. .............. | 370/252 |
| 6,658,010 B1 | * | 12/2003 | Enns et al. ................... | 370/401 |
| 6,757,255 B1 | * | 6/2004 | Aoki et al. ................... | 370/252 |
| 7,139,829 B2 | * | 11/2006 | Wenzel et al. ............... | 709/232 |
| 2003/0009594 A1 | * | 1/2003 | McElligott .................. | 709/245 |
| 2004/0184458 A1 | * | 9/2004 | Shimada ...................... | 370/392 |
| 2006/0002425 A1 | * | 1/2006 | Mane et al. .................. | 370/477 |
| 2006/0221854 A1 | * | 10/2006 | Price et al. ................... | 370/253 |
| 2008/0095187 A1 | * | 4/2008 | Jung et al. ................... | 370/468 |

* cited by examiner

*Primary Examiner*—Kwang B Yao
*Assistant Examiner*—Anh Ngoc Nguyen
(74) *Attorney, Agent, or Firm*—Sterne, Kessler, Goldstein & Fox P.L.L.C.

(57) ABSTRACT

Methods and systems for estimating available bandwidth on an internet access network are presented. A method includes: (a) transmitting one or more Internet Control Message Protocol (ICMP) echo request packets to a device residing on the network at a first bit rate; (b) receiving one or more ICMP echo reply packets corresponding to the one or more ICMP echo request packets responsive to step (a); and (c) determining a second bit rate for the one or more ICMP echo reply packets. If the second bit rate is less than the first bit rate, available bandwidth is estimated based on the second bit rate. If the second bit rate is not less than the first bit rate, steps (a), (b) and (c) are repeated. The first bit rate is increased for each iteration, until the second bit rate is less than the first bit rate, and then available bandwidth is estimated based on the second bit rate.

30 Claims, 7 Drawing Sheets

BANDWIDTH ESTIMATION ALGORITHM USING INTERNET CONTROL MESSAGE PROTOCOL (ICMP) ECHO REQUEST

BACKGROUND OF THE INVENTION

1. Field of the Invention

The invention relates generally to communication systems and, more particularly, to methods and systems for measuring available bandwidth on internet access networks.

2. Related Art

A conventional technique for estimating the available upstream link bandwidth for a communications device operating on an internet access network includes a manually-configured or self-installed installer unit at the user location. The installer sets a variable in the communications device corresponding to the available upstream bandwidth. A disadvantage of this bandwidth estimation technique is that the variable is not updated periodically to reflect changing conditions on the network. For example, if the actual available upstream bandwidth changes over time, then the value set by the installer will be inaccurate and could even "punish" the user if the value set by the installer is less than the amount of upstream bandwidth that is actually available on the network at a given time.

In another conventional bandwidth estimation technique, the communications device establishes a transmission control protocol (TCP) connection with a server that uses TCP to measure upstream bandwidth availability. During the estimation process, TCP ramps up the bit rate of the data through the connection until it converges upon the size of the upstream link. A problem with TCP bandwidth estimation is the communications device might not have a server readily available with which to establish the TCP connection. Also, TCP bandwidth estimation can be intrusive. During the estimation process, TCP ramps up the bit rate fairly aggressively such that it might interfere with existing data services on the network. For example, for voice over IP (VoIP), TCP bandwidth estimation can introduce jitter and latency to a call. Accordingly, TCP bandwidth estimation should be limited to off-hours periods. This limitation is undesirable, however, because it precludes the server from obtaining frequent updates to assess changing conditions on the network.

In yet another conventional bandwidth estimation technique, a communications device, such as a cable modem, is connected to a standalone multimedia terminal adapter (MTA). The MTA sends packets to the communications device and queries what bandwidth is available. This bandwidth estimation technique is problematic because it relies on proprietary hardware and software to perform the query.

What is needed, therefore, is an automatic, non-intrusive, device-independent, and connection-independent technique for estimating the available upstream bandwidth for a device operating on an internet access network.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention. The drawing in which an element first appears is typically indicated by the leftmost digit(s) in the corresponding reference number.

DETAILED DESCRIPTION OF THE INVENTION

Overview

Figure 1A:
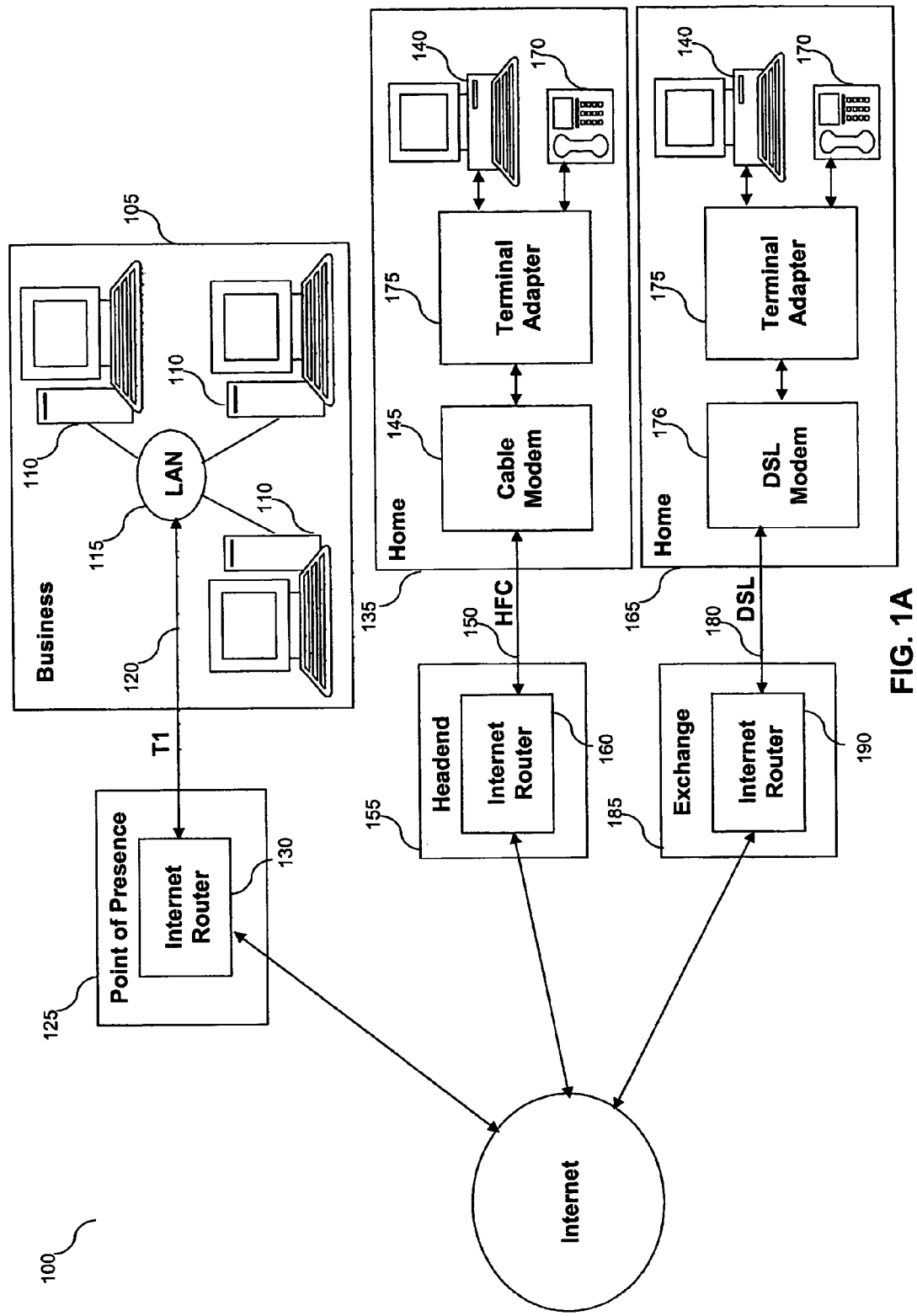
FIGS. 1A and 1B illustrate simplified block diagrams of an exemplary internet access network.

In a first exemplary embodiment of the present invention, a method of estimating available bandwidth on an internet access network includes: transmitting an Internet Control Message Protocol (ICMP) echo request packet to a device residing on the internet access network at a first bit rate; receiving an ICMP echo reply packet responsive to the transmitting step; determining a second bit rate of the ICMP echo reply packet; and estimating an available bandwidth based on the second bit rate.

In another embodiment, the transmitting step includes transmitting an ICMP echo request packet on an upstream channel of the internet access network. In yet another embodiment, the transmitting step includes transmitting an ICMP echo request packet to a router residing on the internet access network. In a further embodiment, the transmitting step includes identifying a nearest available router, and transmitting the ICMP echo request packet to the nearest available router.

In a still further embodiment, the method also includes transmitting packets to the device residing on the internet access network at approximately the second bit rate.

In a second exemplary embodiment of the present invention, a method of estimating available bandwidth on an internet access network includes: transmitting a series of ICMP echo request packets to a device residing on the internet access network at a first bit rate; receiving a series of ICMP echo reply packets responsive to the transmitting step; determining a second bit rate based on bit rates associated with the ICMP echo reply packets; and estimating an available bandwidth based on the second bit rate.

In another embodiment, the determining step includes determining a second bit rate based on an average of the bit rates associated with the ICMP echo reply packets.

In a third exemplary embodiment of the present invention, a method of estimating available bandwidth on an internet access network includes: transmitting one or more ICMP echo request packets to a device residing on the internet access network at a first bit rate; receiving one or more ICMP echo reply packets corresponding to the one or more ICMP echo request packets responsive to the transmitting step; and determining a second bit rate for the one or more ICMP echo reply packets. If the second bit rate is less than the first bit rate, the method includes estimating an available bandwidth based on the second bit rate.

Alternatively, if the second bit rate is not less than the first bit rate, the method includes iteratively performing the transmitting, receiving, and determining steps. In this case, the method further includes increasing the first bit rate for each iteration, until the second bit rate is less than the first bit rate, and estimating an available bandwidth based on the second bit rate. In another embodiment, increasing the first bit rate includes transmitting an increased number of ICMP echo request packets in a predetermined time period. In yet another embodiment, increasing the first bit rate includes increasing a packet size of the one or more ICMP echo request packets transmitted. In a further embodiment, increasing the first bit rate includes both transmitting an increased number of ICMP echo request packets in a predetermined time period, and increasing a packet size of the increased number of ICMP echo request packets transmitted.

In another embodiment, the receiving step further includes repeating the transmitting step if one or more ICMP echo reply packets corresponding to the one or more ICMP echo request packets responsive to the transmitting step are not received.

In yet another embodiment, the method also includes periodically repeating the steps of the method to detect the presence of another device residing on the internet access network, based on changes in available bandwidth during a predetermined time period.

In a fourth exemplary embodiment of the present invention, a computer program product has control logic stored therein. The control logic, when executed, enables a computer to estimate available bandwidth on an internet access network. The control logic includes: means for enabling the computer to transmit an ICMP echo request packet to a device residing on the internet access network at a first bit rate; means for enabling the computer to receive an ICMP echo reply packet responsive to the ICMP echo request packet; means for enabling the computer to determine a second bit rate of the ICMP echo reply packet; and means for enabling the computer to estimate an available bandwidth based on the second bit rate.

In a fifth exemplary embodiment of the present invention, a system for estimating available bandwidth on an internet access network includes a first device residing on the internet access network and a terminal adapter coupled to the first device. The terminal adapter transmits an ICMP echo request packet to a second device residing on the internet access network at a first bit rate, receives an ICMP echo reply packet responsive to the ICMP echo request packet, and determines a second bit rate of the ICMP echo reply packet. The terminal also estimates an available bandwidth based on the second bit rate.

In another embodiment, the first device includes a cable modem. In yet another embodiment, the first device includes a digital subscriber line (DSL) modem. In a further embodiment, the second device includes a router on the internet access network. In a still further embodiment, the terminal adapter transmits packets through the first device to the second device at approximately the second bit rate.

The methods and systems of the present invention described herein are advantageous because they use a well-established protocol (i.e., ICMP) that is ubiquitously supported by routers on internet access networks. Furthermore, by capitalizing on the communications device always having a router on the internet access network with which to connect, the methods and systems of the present invention do not require specialized services, servers, or proprietary hardware in order to perform bandwidth estimation, thus, they are device independent.

The methods and systems of the present invention are also advantageous because they produce bandwidth estimation data representative of existing network conditions, and the data can be updated periodically to detect changes in the available bandwidth due to changes in the network conditions. Furthermore, the methods and systems of the present invention detect these changes automatically (i.e., without manual installation or configuration by the user).

Moreover, the methods and systems of the present invention are non-intrusive, and estimate the bandwidth without disrupting on-going communications on the network, advantageously promoting frequent, automatic, bandwidth estimation updates. Additional features of the methods and systems of the present invention are described below in more detail.

This specification discloses one or more embodiments that incorporate the features of this invention. The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Systems for Estimating Available Bandwidth

The bandwidth estimation technique of the present invention is particularly useful in the environment of a communications device providing services on an internet access network, where the quality of the services depends on the available bandwidth. Such services include, for example, VoIP telephony applications, streaming video, on-line gaming, and other applications, which require bandwidth at a guaranteed rate.

Figure 1B:
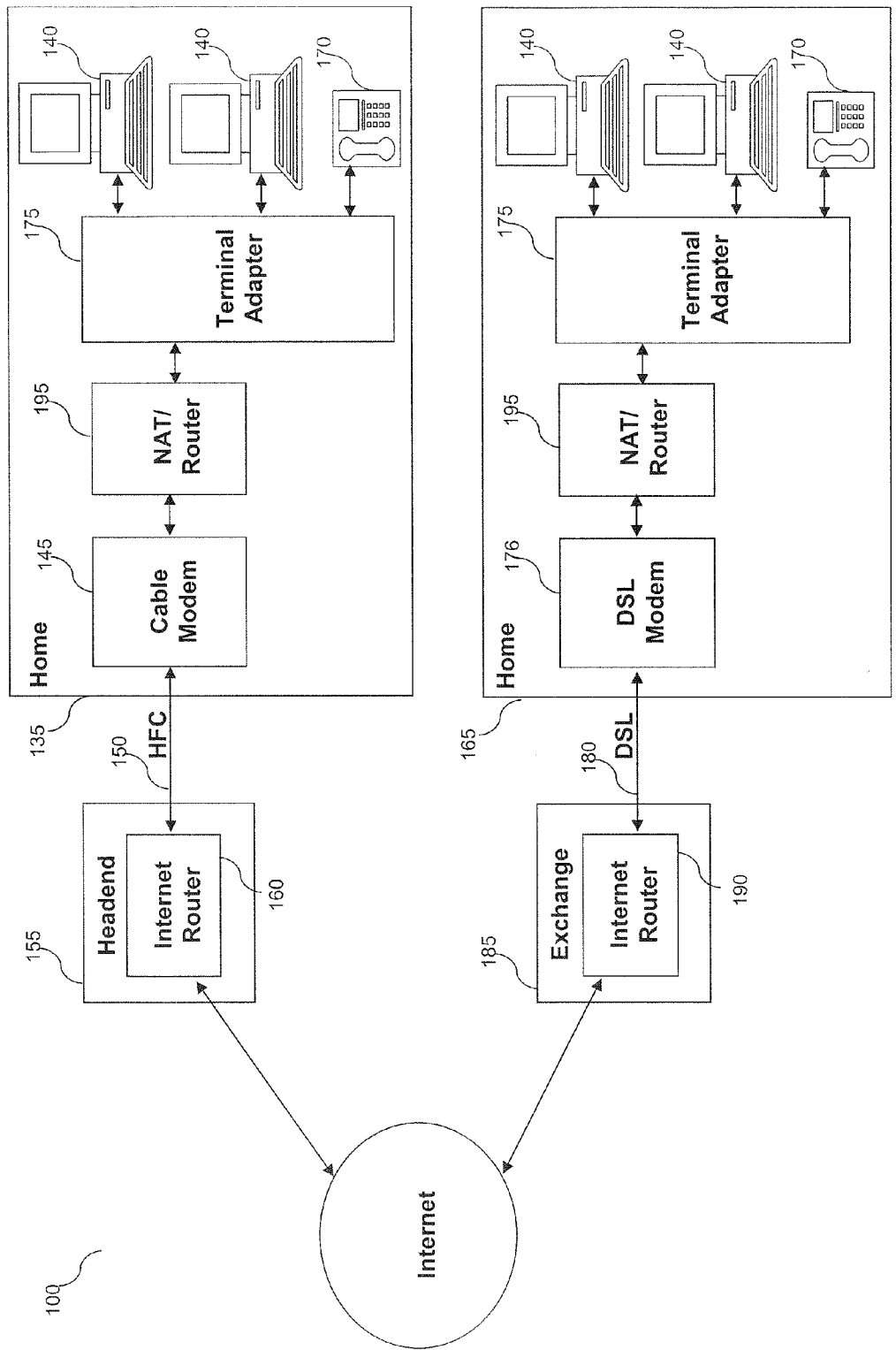

FIGS. 1A and 1B illustrate such an environment including the present invention. In FIG. 1A, an example internet access network 100 includes a business 105 and residences 135 and 165. Business 105 includes several workstations 110 coupled to a local area network (LAN) 115. LAN 115 transmits data over a T1 connection to an internet router 130 of a Point of Presence (POP) 125 of an Internet Service Provider (ISP).

Also shown in FIG. 1A is residence 135 that includes a personal computer 140 and a telephone 170 both coupled to a terminal adapter (TA) 175. TA 175 is coupled to a cable modem 145. For example, cable modem 145 can be a DOCSIS-compliant cable modem. Cable modem 145 transmits data over a hybrid fiber-coaxial (HFC) network 150 to an internet router 160 of a headend 155 of a cable service provider. FIG. 1A further shows a residence 165 that includes personal computer 140 and telephone 170 both coupled to TA 175. In this case, TA 175 is coupled to a digital subscriber line (DSL) modem 176. DSL modem 176 transmits data over a DSL 180 to an internet router 190 of an exchange 185 of a DSL service provider.

FIG. 1B shows another implementation of residences 135 and 165 on internet access network 100. In FIG. 1B, residence 135 includes multiple personal computers 140 and telephone 170, and further includes a Network Address Translation (NAT) router 195 coupled between TA 175 and cable modem 145. Similarly, residence 165 includes multiple personal computers 140 and telephone 170, and further includes NAT router 195 coupled between TA 175 and DSL modem 176. NAT technology allows multiple devices on a home/customer's network to share a single internet connection over a single IP address.

The bandwidth estimation techniques of the present invention are not limited to example internet access network 100 shown in FIGS. 1A and 1B, and can be implemented for a variety of other networks, such as satellite, fiber (e.g., FDDI), ISDN, ATM, and dial-up networks, among others.

For communications devices that do not have the benefit of specially-provisioned scheduling services for maintaining a desired Quality of Service (e.g., the DOCSIS unsolicited grant service (UGS), among others), knowing the total available upstream bandwidth is a useful but not a readily available parameter. Thus, according to an embodiment of the present invention, a desired Quality of Service for a communications device on an internet access network is maintained using ICMP-based bandwidth estimation techniques to estimate available upstream link bandwidth.

The bandwidth estimation techniques of the present invention use ICMP, which is an IP-based message control and error-reporting protocol, ubiquitously supported by routers on internet access networks. A router that implements an ICMP echo server function can receive from a communications device an echo request packet, also called a "ping" packet, and transmit to the communications device an echo reply packet containing the same data sent in the echo request packet. Thus, the ICMP echo request is typically used to verify end-to-end connectivity between two network devices.

According to an embodiment of the present invention, the ICMP echo request is used to estimate the available bandwidth between two network devices, and in particular, the available upstream link bandwidth for an "access link" of a communications device on the network. The access link refers to the link between the communications device and a nearest available router of a service provider on the network. The access link is typically the source of the "bottleneck" on the network (as opposed to links beyond the service provider). For example, as shown in FIG. 1A, the nearest available router for cable modem 145 is internet router 160 of headed 155, and the nearest available router for DSL modem 176 is internet router 190 of exchange 185. Methods for identifying a nearest available router on an internet access network are discussed in detail below.

Furthermore, internet access networks are typically asymmetrical, such that the available bandwidth on the upstream link (i.e., the communications device-to-router link) is typically less than the available bandwidth on the downstream link (i.e., the router-to-communications device link). Because the ICMP echo request is a roundtrip packet, the bandwidth estimation techniques of the present invention estimate the available bandwidth for the access link having the least amount of bandwidth available. The communications device will be limited to the smallest available bandwidth regardless of whether the bandwidth limitation is measured on the upstream or downstream link. Thus, while the bottleneck is typically on the upstream access link, the bandwidth estimation techniques of the present invention will locate the tightest bottleneck in the network, whether it is due to the upstream or downstream access links.

Methods for Estimating Available Bandwidth

Figure 2:
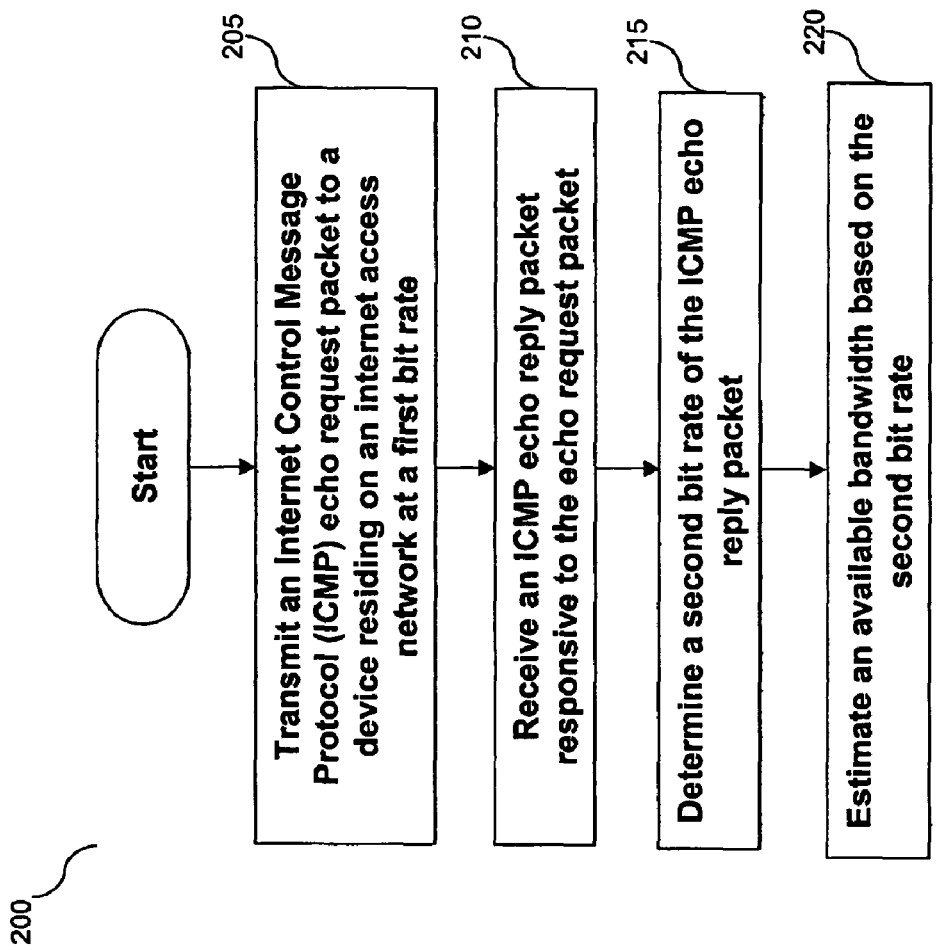
FIGS. 2-4 show process flowcharts providing example steps for estimating available bandwidth on an internet access network in accordance with one or more embodiments of the present invention.
Figure 3:
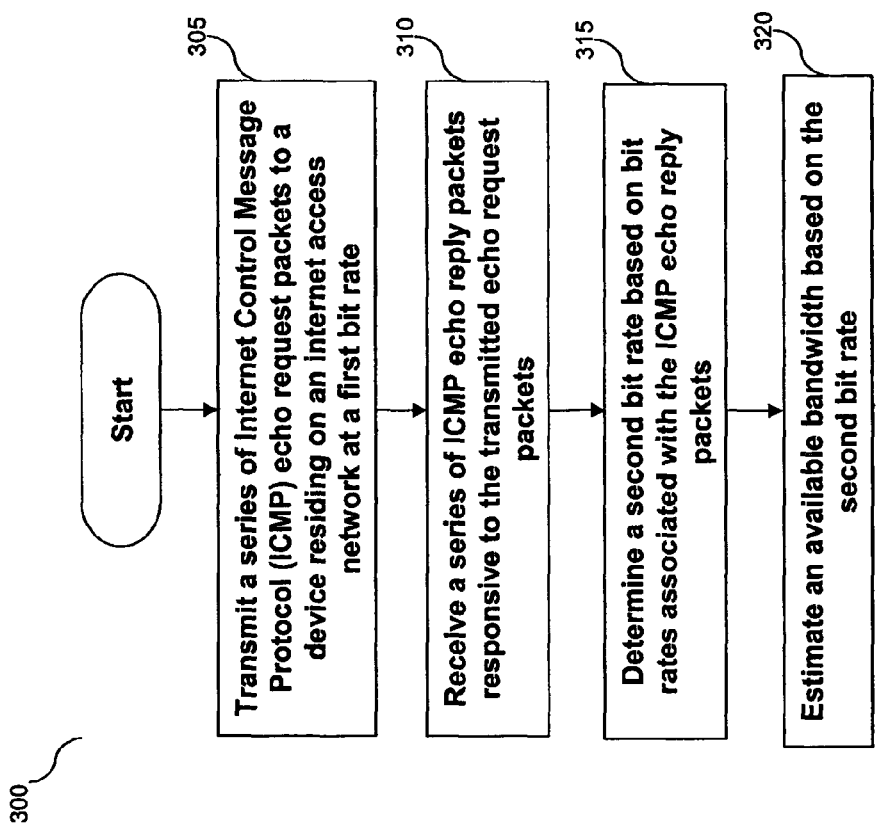
Figure 4:
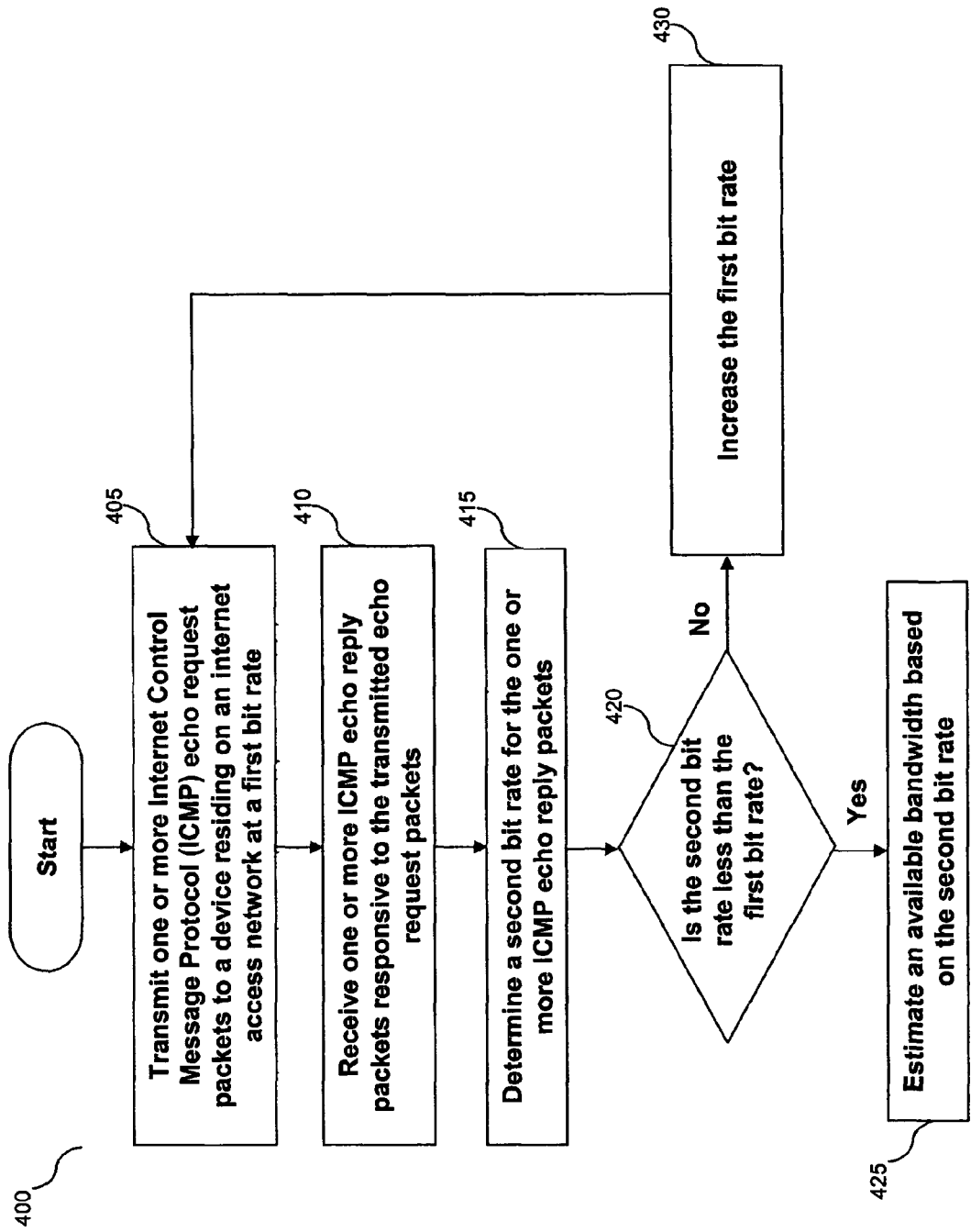
Figure 5:
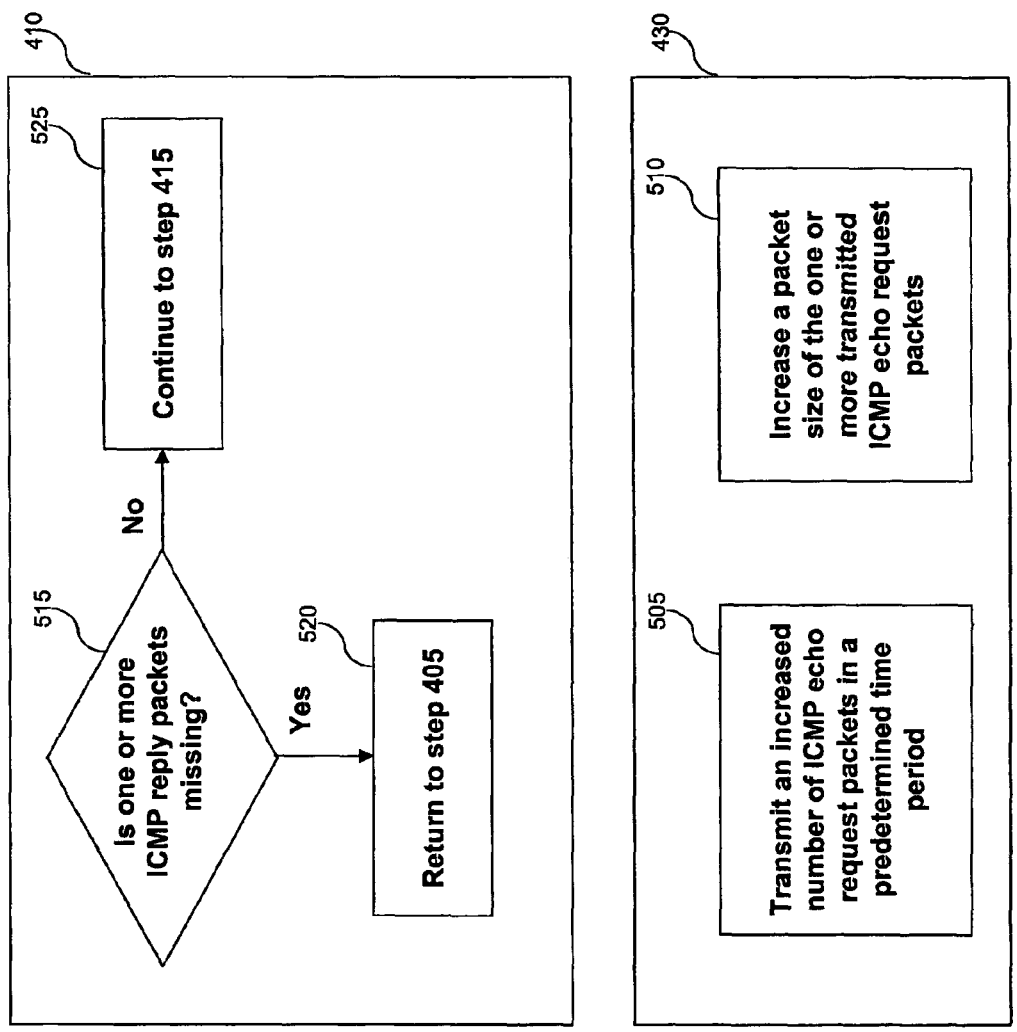
FIGS. 5 and 6 show optional additional steps for estimating available bandwidth on an internet access network in accordance with one or more further embodiments of the present invention.
Figure 6:
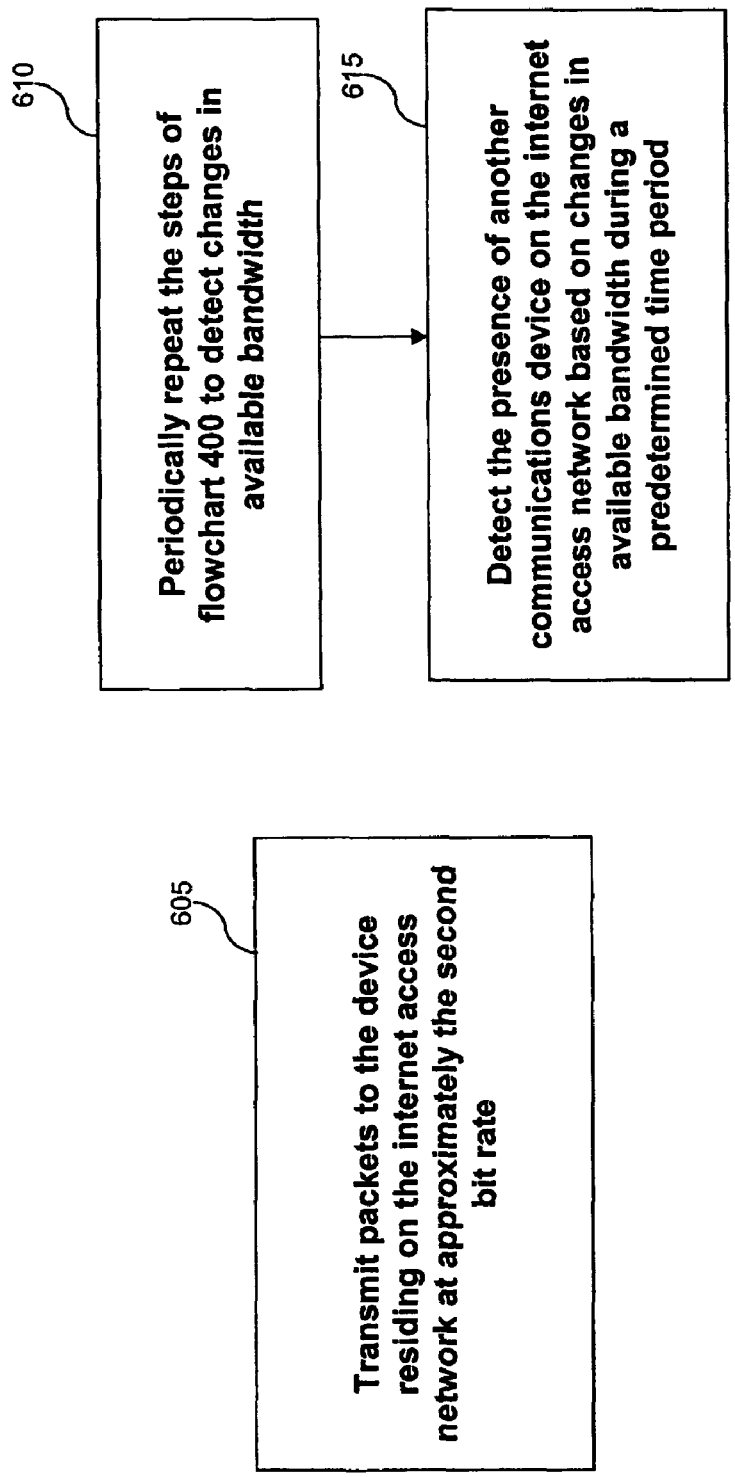

FIGS. 2-4 show process flowcharts providing example steps for estimating available bandwidth on an internet access network, according to one or more embodiments of the present invention. FIGS. 5 and 6 provide additional optional steps according to one or more further embodiments of the present invention. The steps of FIGS. 2-6 do not necessarily have to occur in the order shown, as will be apparent to persons skilled in the relevant art(s) based on the teachings herein. Other operational and structural embodiments will be apparent to persons skilled in the relevant art(s) based on the following discussion. These steps are described in detail below.

FIG. 2 shows a process flowchart 200 providing example high-level steps for estimating available bandwidth on an internet access network according to a first exemplary embodiment.

In step 205, an ICMP echo request packet is transmitted to a device residing on the internet access network at a first bit rate. In an embodiment, step 205 includes transmitting the ICMP echo request packet on an upstream channel of the internet access network. In another embodiment, step 205 includes transmitting the ICMP echo request packet to a router residing on the internet access network.

In yet another embodiment, step 205 includes identifying a nearest available router and transmitting the ICMP echo request packet to the nearest available router. When no local NAT router is present between the TA and the modem, the nearest available router on the internet access network is simply the default gateway assigned to the TA by the Dynamic Host Configuration Protocol (DHCP). This case is illustrated in FIG. 1A, where internet router 160 is the nearest available router for TA 175 of residence 135, and internet router 190 is the nearest available router for TA 175 of residence 165.

When a local NAT router is present between the TA and the modem, as shown in FIG. 1B, an algorithm similar that used by the well-known traceroute utility can be used to identify the nearest available router on the internet access network. A NAT router between the TA and the modem is usually present if the TA is assigned an IP address in the range of 192.168.0.0 through 192.168.255.255, which is a private non-routable address range typically assigned by NAT routers.

According to the traceroute utility, when the TA sends an IP packet to any arbitrary off-network IP address with a small Time-To-Live (TTL) value in the IP header (e.g., 2), the local NAT router on the home/customer's network will decrement the TTL of the packet by one (e.g., the local NAT router will decrement an initial TTL of 2 to a TTL of 1). The next router that handles the packet will be the nearest available router on the internet access network. This router will also decrement the TTL by one (e.g., the router will decrement a TTL of 1 to a TTL of 0). When the TTL reaches zero, the router is required to discard the packet and reply to the TA with an ICMP Time Exceeded packet. The TA can then determine the IP address of the nearest available router from the source IP address field of the ICMP Time Exceeded packet. Larger initial TTL values can be used in the case of multiple NAT routers coupled in series on the home/customer's network (not a typical case).

In step 210, an ICMP echo reply packet is received responsive to the echo request packet.

In step 215, a second bit rate of the ICMP echo reply packet is determined. For example, in FIG. 1A, TA 175 receives the echo reply packet from internet router 190 through DSL modem 176, and detects the second bit rate.

In step 220, an available upstream bandwidth is estimated based on the second bit rate.

In a further embodiment, process 200 includes the additional step of transmitting packets to the device residing on the internet access network at approximately the second bit rate. For example, as shown in FIG. 1A, TA 175 transmits VoIP packets through DSL modem 176 to internet router 190 at the second bit rate.

FIG. 3 shows a process flowchart 300 also providing example high-level steps for estimating available bandwidth on an internet access network according to a second exemplary embodiment.

In step 305, a series of ICMP echo request packets is transmitted to a device residing on the internet access network at a first bit rate. In one embodiment, step 305 includes transmitting the series of ICMP echo request packets on an upstream channel of the internet access network. In another embodiment, step 305 includes transmitting the series of ICMP echo request packets to a router residing on the internet access network. In yet another embodiment, step 305 includes identifying a nearest available router and transmitting the series of ICMP echo request packets to the nearest available router. For example, as shown in FIG. 1A, TA 175 transmits a series of ICMP echo request packets through DSL modem 176 to internet router 190 at the first bit rate, according to step 305.

In step 310, a series of ICMP echo reply packets is received responsive to the transmitted echo request packets.

In step 315, a second bit rate is determined based on bit rates associated with the ICMP echo reply packets. In a further embodiment, step 315 includes determining the second bit rate based on an average of the bit rates associated with the ICMP echo reply packets. For example, in FIG. 1A, TA 175 receives a series of echo reply packets through DSL modem 176 from internet router 190, and determines the second bit rate based on bit rates associated with the ICMP echo reply packets.

In step 320, an available upstream bandwidth is estimated based on the second bit rate.

In a still further embodiment, process 300 includes the additional step of transmitting packets to the device residing on the internet access network at approximately the second bit rate. For example, as shown in FIG. 1A, TA 175 transmits VoIP packets through DSL modem 176 to internet router 190 at the second bit rate.

FIG. 4 shows a process flowchart 400 also providing example high-level steps for estimating available bandwidth on an internet access network according to a third exemplary embodiment.

In step 405, one or more ICMP echo request packets are transmitted to a device residing on the internet access network at a first bit rate. In one embodiment, step 405 includes transmitting one or more ICMP echo request packets on an upstream channel of the internet access network. In another embodiment, step 405 includes transmitting one or more ICMP echo request packets to a router residing on the internet access network. In yet another embodiment, step 405 includes identifying a nearest available router, and transmitting one or more ICMP echo request packets to the nearest available router. For example, as shown in FIG. 1A, TA 175 transmits one or more ICMP echo request packets through DSL modem 176 to internet router 190 at the first bit rate, according to step 405.

In step 410, one or more ICMP echo reply packets are received responsive to the transmitted echo request packets.

In step 415, a second bit rate is determined for the one or more ICMP echo reply packets.

In step 420, it is determined whether the second bit rate is less than the first bit rate. The ICMP echo server function provides that an echo reply packet is received at approximately the same bit rate at which a corresponding echo request packet is transmitted. Accordingly, if the bit rate of a received echo reply packet is less than the bit rate of a corresponding echo request packet, then an available bandwidth can be determined. In other words, if the echo request packet is transmitted at a bit rate greater than the available bandwidth, then the bit rate of the received echo reply packet approximates the bit rate of the bottleneck in the roundtrip path, or the maximum available bandwidth.

Thus, in step 425, if the second bit rate is less than the first bit rate, then an available bandwidth is estimated based on the second bit rate.

Alternatively, in step 430, if the second bit rate is not less than the first bit rate, then steps 405 through 420 are repeated. The first bit rate is increased for each iteration until the second bit rate is less than the first bit rate, and then an available bandwidth can be estimated based on the second bit rate, in step 425.

FIG. 5 provides optional additional steps for steps 410 and 430, shown in FIG. 4.

In one embodiment, step 410 includes step 515. If one or more ICMP reply packets responsive to the transmitted echo request packets are not received, then in step 520, the process returns to step 405, and one or more ICMP echo request packets are transmitted at the first bit rate. If one or more ICMP reply packets responsive to the transmitted echo request packets are received, then in step 525, the process proceeds to step 415, and a second bit rate for the one or more ICMP echo reply packets is determined.

In another embodiment, step 430 includes step 505. In step 505, the first bit rate is increased by transmitting an increased number of ICMP echo request packets in a predetermined time period.

In yet another embodiment, step 430 includes step 510. In step 510, the first bit rate is increased by increasing a packet size of the one or more ICMP echo request packets transmitted in step 405.

In a further embodiment, step 430 includes both steps 505 and 510 such that the first bit rate is increased by both transmitting an increased number of ICMP echo request packets in a predetermined time period, and increasing a packet size of the one or more ICMP echo request packets transmitted in step 405.

FIG. 6 provides optional additional steps for process 400.

In step 605, after determining an available upstream bandwidth in step 425, packets are transmitted to the device residing on the internet access network at approximately the second bit rate. For example, in FIG. 1A, TA 175 transmits VoIP data from telephone 170 to internet router 190 through DSL modem 176 at the second bit rate.

In step 610, the steps of process 400 are periodically repeated to detect changes in the available bandwidth. For example, if another communications device transmits over the internet access network, the available bandwidth will decrease. Accordingly, in step 615, the presence of another communications device residing on the internet access network is detected based on the detected changes in available bandwidth over a period of time. In this way, process 400 can be implemented to accommodate the presence of other communications devices residing on the internet access network, while maintaining a desired quality of service.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method of estimating available bandwidth on an internet access network, comprising:
    (a) transmitting, by a terminal adapter, an Internet Control Message Protocol (ICMP) echo request packet to a device residing on the internet access network at a first bit rate;
    (b) receiving, by the terminal adapter, an ICMP echo reply packet responsive to step (a);
    (c) repeating, by the terminal adapter, step (a) if the ICMP echo reply packet is not received;
    (d) determining, by the terminal adapter, a second bit rate of the ICMP echo reply packet;
    (e) iteratively performing, by the terminal adapter, steps (a), (b), (c) and (d) by increasing the first bit rate for each iteration until the second bit rate is less than the first bit rate; and
    (f) estimating, by the terminal adapter, the available bandwidth based on the second bit rate.

2. The method of claim 1, wherein step (a) comprises:
    (a)(i) transmitting the ICMP echo request packet on an upstream channel of the internet access network.

3. The method of claim 1, wherein step (a) comprises:
    (a)(i) transmitting the ICMP echo request packet to a router residing on the internet access network.

4. The method of claim 3, wherein step (a)(i) comprises:
    (a)(i)(A) identifying a nearest available router; and
    (a)(i)(B) transmitting the ICMP echo request packet to the nearest available router.

5. The method of claim 1, further comprising:
    (g) transmitting packets to the device residing on the internet access network at approximately the second bit rate.

6. A method of estimating available bandwidth on an internet access network, comprising:
    (a) transmitting, by a terminal adapter, a series of Internet Control Message Protocol (ICMP) echo request packets to a device residing on the internet access network at a first bit rate;
    (b) receiving, by the terminal adapter, a series of ICMP echo reply packets responsive to step (a);
    (c) repeating, by the terminal adapter, step (a) if the series of ICMP echo reply packets are not received;
    (d) determining, by the terminal adapter, a second bit rate based on bit rates associated with the ICMP echo reply packets;
    (e) iteratively performing steps (a), (b), (c) and (d) by increasing the first bit rate for each iteration until the second bit rate is less than the first bit rate; and
    (f) estimating, by the terminal adapter, the available bandwidth based on the second bit rate.

7. The method of claim 6, wherein step (d) comprises:
    (d)(i) determining the second bit rate based on an average of the bit rates associated with the ICMP echo reply packets.

8. The method of claim 6, wherein step (a) comprises:
    (a)(i) transmitting the series of ICMP echo request packets on an upstream channel of the internet access network.

9. The method of claim 6, wherein step (a) comprises:
    (a)(i) transmitting the series of ICMP echo request packets to a router residing on the internet access network.

10. The method of claim 9, wherein step (a)(i) comprises:
    (a)(i)(A) identifying a nearest available router and transmitting the series of ICMP echo request packets to the nearest available router.

11. The method of claim 6, further comprising:
    (g) transmitting packets to the device residing on the internet access network at approximately the second bit rate.

12. A method of estimating available bandwidth on an internet access network, comprising:
    (a) transmitting, by a terminal adapter, one or more Internet Control Message Protocol (ICMP) echo request packets to a device residing on the internet access network at a first bit rate;
    (b) receiving, by the terminal adapter, one or more ICMP echo reply packets corresponding to the one or more ICMP echo request packets responsive to step (a);
    (c) repeating, by the terminal adapter, step (a) if the one or more ICMP echo reply packets are not received;
    (d) determining, by the terminal adapter, a second bit rate for the one or more ICMP echo reply packets;
    (e) if the second bit rate is less than the first bit rate, estimating the available bandwidth based on the second bit rate; and
    (f) if the second bit rate is not less than the first bit rate: (i) iteratively performing steps (a), (b), (c) and (d), wherein iteratively performing steps (a), (b), (c) and (d) comprises:
        (f)(i) increasing the first bit rate for each iteration, until the second bit rate is less than the first bit rate, and
        (f)(ii) estimating the available bandwidth based on the second bit rate.

13. The method of claim 12, wherein step (f)(i) comprises:
    (f)(i)(A) transmitting an increased number of the one or more ICMP echo request packets in a predetermined time period.

14. The method of claim 12, wherein step (f)(i) comprises:
    (f)(i)(A) increasing a packet size of the one or more ICMP echo request packets transmitted in step (a).

15. The method of claim 12, wherein step (f)(i) comprises:
    (f)(i)(A) transmitting an increased number of the one or more ICMP echo request packets in a predetermined time period; and
    (f)(i)(B) increasing a packet size of the increased number of the one or more ICMP echo request packets transmitted in step (a).

16. The method of claim 12, wherein step (a) comprises:
    (a)(i) transmitting one or more ICMP echo request packets on an upstream channel of the internet access network.

17. The method of claim 12, wherein step (a) comprises:
    (a)(i) transmitting the one or more ICMP echo request packets to a router residing on the internet access network.

18. The method of claim 17, wherein step (a)(i) comprises:
    (a)(i)(A) identifying a nearest available router and transmitting the one or more ICMP echo request packets to the nearest available router.

19. The method of claim 12, further comprising:
    (g) transmitting packets to the device residing on the internet access network at approximately the second bit rate.

20. The method of claim 12, further comprising:
(g) periodically repeating steps (a)-(f) to detect the presence of another device residing on the internet access network based on changes in the available bandwidth during a predetermined time period.

21. A computer program product having instructions stored thereon in a non-transitory machine-readable medium, the instructions, when executed, enable one or more processors to estimate available bandwidth on an internet access network, the instructions comprising:
   instructions to enable the one or more processors to transmit an Internet Control Message Protocol (ICMP) echo request packet to a device residing on the internet access network at a first bit rate;
   instructions to enable the one or more processors to receive an ICMP echo reply packet responsive to the ICMP echo request packet;
   instructions to enable the one or more processors to transmit the ICMP echo request packet to the device residing on the internet access network at the first bit rate if the ICMP echo reply packet is not received;
   instructions to enable the one or more processors to determine a second bit rate of the ICMP echo reply packet;
   instructions to iteratively transmit the ICMP echo request packet at the first bit rate until the second bit rate is less than the first bit rate, the first bit rate being increased for each iteration; and
   instructions to enable the one or more processors to estimate an available bandwidth based on the second bit rate.

22. The computer program product of claim 21, wherein the instructions to enable the one or more processors to transmit the ICMP echo request packet comprises:
   instructions to enable the one or more processors to transmit the ICMP echo request packet on an upstream channel of the internet access network.

23. The computer program product of claim 21, wherein the instructions to enable the one or more processors to transmit the ICMP echo request packet comprises:
   instructions to enable the one or more processors to transmit the ICMP echo request packet to a router residing on the internet access network.

24. The computer program product of claim 21, wherein the instructions to enable the one or more processors to transmit the ICMP echo request packet comprises:
   instructions to enable the one or more processors to identify a nearest available router; and
   instructions to transmit the ICMP echo request packet to the nearest available router.

25. The computer program product of claim 21, further comprising:
   instructions to enable the one or more processors to transmit packets to the device residing on the internet access network at approximately the second bit rate.

26. A system for estimating available bandwidth on an internet access network, comprising:
   a first device residing on the internet access network; and
   a terminal adapter, coupled to the first device, configured to transmit an Internet Control Message Protocol (ICMP) echo request packet to a second device residing on the internet access network at a first bit rate, to receive an ICMP echo reply packet responsive to the ICMP echo request packet, to transmit the ICMP echo request packet to the device residing on the internet access network at the first bit rate if the ICMP echo reply packet is not received, and to determine a second bit rate of the ICMP echo reply packet,
   wherein the terminal adapter is further configured to iteratively transmit the ICMP echo request packet at the first bit rate until the second bit rate is less than the first bit rate, the first bit rate being increased for each iteration, and
   wherein the terminal adapter is further configured to estimate the available bandwidth based on the second bit rate.

27. The system of claim 26, wherein the first device includes a cable modem.

28. The system of claim 26, wherein the first device includes a digital subscriber line (DSL) modem.

29. The system of claim 26, wherein the second device includes a router on the internet access network.

30. The system of claim 26, wherein the terminal adapter is further configured to transmit packets through the first device to the second device at approximately the second bit rate.

* * * * *